United States Patent
Muchel

(10) Patent No.: US 7,492,531 B2
(45) Date of Patent: Feb. 17, 2009

(54) APOCHROMATIC CONDENSER

(75) Inventor: Franz Muchel, Koenigsbronn (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 216 days.

(21) Appl. No.: 10/595,834

(22) PCT Filed: Dec. 2, 2004

(86) PCT No.: PCT/EP2004/013673

§ 371 (c)(1),
(2), (4) Date: May 15, 2006

(87) PCT Pub. No.: WO2005/059620

PCT Pub. Date: Jun. 30, 2005

(65) Prior Publication Data

US 2007/0171518 A1      Jul. 26, 2007

(30) Foreign Application Priority Data

Dec. 12, 2003   (DE) ................................. 103 58 122

(51) Int. Cl.
*G02B 9/00*     (2006.01)
(52) U.S. Cl. ........................................ 359/754; 359/753

(58) Field of Classification Search ......... 359/656–662, 359/643–647
See application file for complete search history.

(56) References Cited

U.S. PATENT DOCUMENTS

| 2,576,011 | A | 11/1951 | Grey |
| 4,576,448 | A | 3/1986 | Ikari |
| 5,734,498 | A | 3/1998 | Krasieva et al. |
| 6,560,033 | B2 * | 5/2003 | Hiraga ........................ 359/659 |
| 2001/0043409 | A1 | 11/2001 | Otomo |
| 2004/0109238 | A1 * | 6/2004 | Sharma ...................... 359/659 |

FOREIGN PATENT DOCUMENTS

| DE | 32 34 965 | 4/1983 |
| DE | 40 08 383 | 9/1990 |

* cited by examiner

Primary Examiner—Timothy J Thompson
(74) Attorney, Agent, or Firm—Reed Smith LLP

(57) ABSTRACT

The invention is directed to an optical system with reduced chromatic aberration, particularly for use in microscopes for imaging the light source in the aperture diaphragm of a condenser. According to the invention, an adapter assembly is associated with a collector assembly. The adapter assembly has an apochromaticizing action and substantially reduces the chromatic aberration of the collector assembly and accordingly achieves the high aperture required on the lamp side for achieving high efficiency.

3 Claims, 2 Drawing Sheets

APOCHROMATIC CONDENSER

CROSS-REFERENCE TO RELATED APPLICATIONS

This application claims priority of International Application No. PCT/EP2004/013673, filed Dec. 2, 2004 and German Application No. 103 58 122.7, filed Dec. 12, 2003, the complete disclosures of which are hereby incorporated by reference.

BACKGROUND OF THE INVENTION a) Field of the Invention

The invention is directed to an optical system with reduced chromatic aberration, particularly for use in microscopes for imaging the light source in the aperture diaphragm of a condenser.

b) Description of the Related Art

Generally, an optical assembly, a so-called collector lens, which corresponds to a collecting field lens, or a collector which comprises a plurality of lenses is used in imaging optical devices, particularly microscopes, for magnified imaging of the light source in the aperture diaphragm of a condenser and for illuminating the image field. The collector lens, or collector, is usually arranged directly in front of the light source.

It is known, for example, to use achromatic collector assemblies which comprise five lenses and in which the chromatic longitudinal aberration is reduced by about half compared to a non-achromatic collector with the same focal length.

OBJECT AND SUMMARY OF THE INVENTION

Therefore, it is the primary object of the invention to provide an optical system in which existing collector assemblies can be used and in which the chromatic aberration of a collector assembly is corrected to a great extent.

According to the invention, the above-stated object is met by an optical system comprising a collector assembly and an apochromaticizing adapter assembly which is associated with the collector assembly.

The apochromaticizing adapter assembly substantially reduces the chromatic aberration of the collector assembly and accordingly achieves the high aperture required on the lamp side for achieving the desired excellent efficiency.

The adapter assembly comprises three lenses, for example. Of these three lenses, one lens having negative power is arranged between two lenses having positive power. These three lenses are advantageously separated from one another by air gaps, and the lens surfaces facing the air gaps have identical radii.

In a special construction, the two lenses having positive power can also be constructed identically with respect to their other optical characteristics.

The adapter assembly can be combined with different collector assemblies, for example, also with collector assemblies having only two collecting lenses.

For purposes of selectively combining the adapter assembly with different collector assemblies so that the chromatic aberration of a collector assembly can always be reduced, it is particularly advantageous when means are provided for detachably connecting the adapter assembly to the respective collector assemblies that are provided. In this way, existing collector assemblies can be adapted to specific requirements for image quality with the aid of the adapter assembly without having to produce a high-quality collector assembly separately for every special requirement.

Means for detachably connecting optical assemblies are known from the prior art and, when adapted in construction in a corresponding manner, can also easily be designed for connecting an adapter assembly to a specific collector assembly to be used.

The optical system according to the invention is preferably designed for wavelengths in the range of 365 nm to 644 nm.

The invention will be described more fully in the following with reference to an embodiment example shown in the accompanying drawings.

DESCRIPTION OF THE PREFERRED EMBODIMENTS

Figure 1:
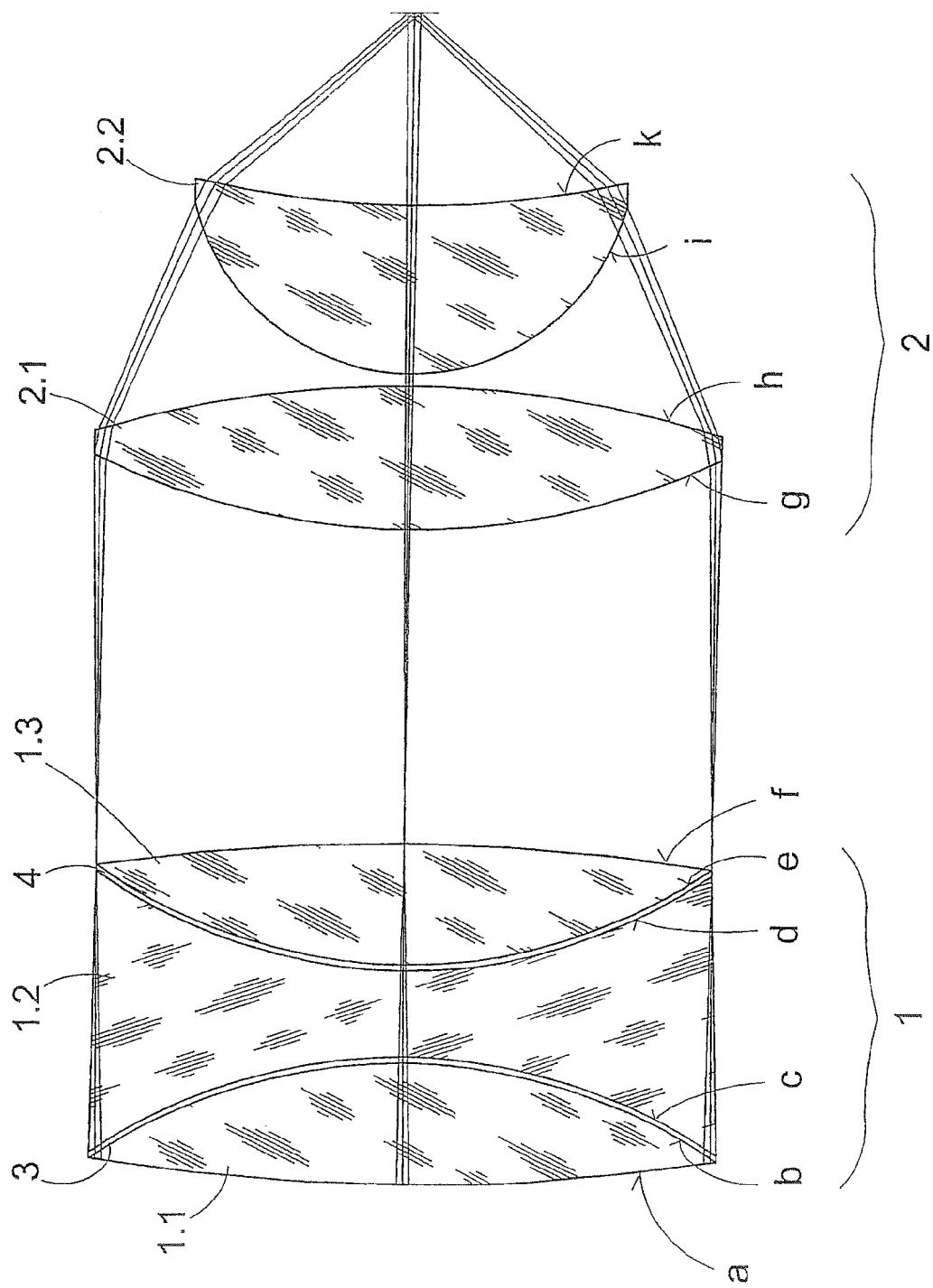
FIG. 1 shows a schematic view of the optical system, according to the invention, which has a collector assembly and an adapter assembly.

FIG. 1 shows the optical system, according to the invention, with an adapter assembly 1, by way of example, which has three lenses 1.1, 1.2 and 1.3 and a collector assembly 2 having two lenses 2.1 and 2.2.

In this system, the adapter assembly 1 is arranged on the light source side and the collector assembly 2 is arranged on the image side. The optically active lens surfaces for the two assemblies are designated consecutively by a to k, starting on the object side.

In this embodiment example, lenses 1.1 and 1.3 of the adapter assembly 1 are constructed identically, both having positive power, and also with their other optical characteristics being identical. On the other hand, lens 1.2 has negative power.

Further, the three lenses 1.1, 1.2 and 1.3 are separated from one another by air gaps 3 and 4. The lens surfaces b and c, d and e which face the air gaps each have the same radius of curvature.

The two lenses 2.1 and 2.2 of the collector assembly 2 have positive power.

The optical system according to the invention which is described above advantageously has the following parameters:

| Assembly | Surface | Radius r | Thickness d | Refractive index $n_e$ | Abbe Number $v_e$ | Diameter |
|---|---|---|---|---|---|---|
| Adapter | a | 130 | 5 | 1.552320 | 63.45999 | 27.38334 |
| | b | −24 | 0.2 | | | 27.38454 |
| | c | −24 | 3 | 1.647690 | 33.849998 | 26.79942 |
| | d | 24 | 0.2 | | | 26.76505 |
| | e | 24 | 5 | 1.552320 | 63.459999 | 27.77575 |
| | f | −130 | | | | 27.75754 |
| | | | 10 | | | |
| Collector | g | 25.119 | 5.8 | 1.522490 | 59.480000 | 28.39285 |
| | h | −54.247 | 0.3 | | | 28.24928 |
| | i | 12.232 | 7.2 | 1.458464 | 67.821443 | 22.63967 |
| | lk | 141.25 | | | | 22.56214 |

In a particularly advantageous manner, the adapter assembly 1 and the collector assembly 2 are connected to one another by a mechanical coupling device which is constructed in such a way that the two assemblies can be detached from one another without auxiliary devices, or with auxiliary devices that are easy to handle, so that it is also possible to use the adapter assembly 1 for combining with and connecting to other collector assemblies in order to achieve the same or similar optical effects with respect to the correction of the chromatic aberration as are accomplished in the selected embodiment example with the collector assembly 2.

The mechanical coupling device is not shown in the drawing but can be assumed in different constructions with correspondingly adapted design from the prior art.

Figure 2:
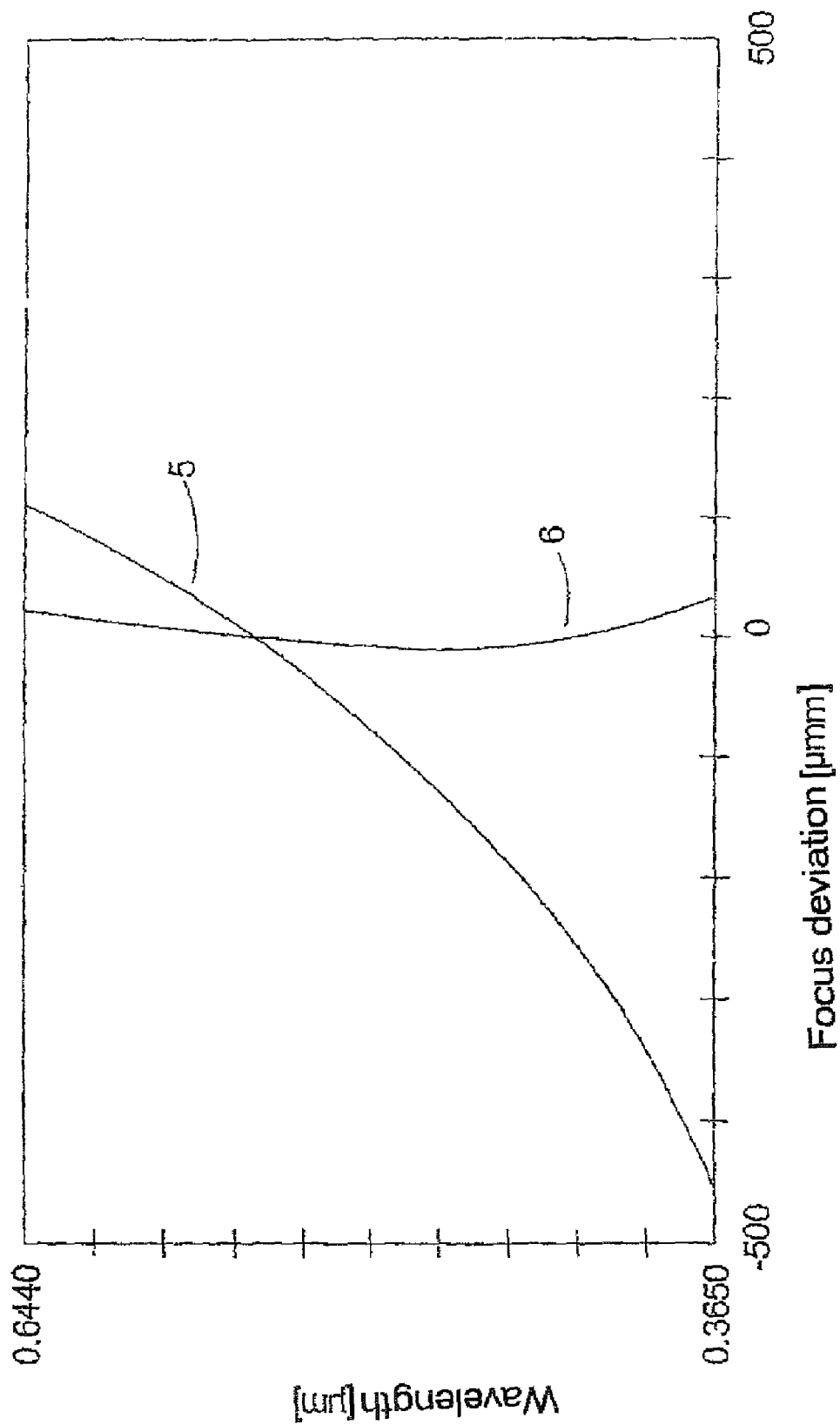
FIG. 2 shows a graph which illustrates the chromatic aberration of the collector assembly from FIG. 1 without an adapter assembly and the chromatic aberration of the optical system, according to the invention, shown in FIG. 1 which comprises the collector assembly and the adapter assembly.

The effect that is achieved through the association of the adapter assembly 1 with the collector assembly 2 in the embodiment example is shown in FIG. 2. In the graph, the focus deviations in µm are plotted on the x coordinate and the wavelength, likewise in µm, is plotted in the y direction. Of the two curves shown in the graph, curve 5 shows the chromatic aberration of the collector assembly 2 without the adapter assembly 1 and its correcting action.

Curve 6 shows to what extent the chromatic aberration is reduced when the collector assembly 2 is associated with the adapter assembly 1 in the manner described above.

While the foregoing description and drawings represent the present invention, it will be obvious to those skilled in the art that various changes may be made therein without departing from the true spirit and scope of the present invention.

REFERENCE NUMBERS 1 adapter assembly
1.1, 1.2, 1.3, 1.4 lenses
2 collector assembly
2.1, 2.2 lenses
3, 4 air gaps
5, 6 curves
a, b, c, d, e, f g, h, i, k lens surfaces

What is claimed is:

1. An optical system with reduced chromatic aberration, for use in microscopes for imaging the light source in the aperture diaphragm of a condenser, comprising:
   a collector assembly; and
   an apochromaticizing adapter assembly which is associated with the collector assembly;
   wherein the adapter has three lenses, wherein one lens having negative power is arranged between two lenses having positive power; and
   wherein the three lenses are separated from one another by air gaps, and the lens surfaces facing the air gaps have identical radii.

2. An optical system with reduced chromatic aberration, for use in microscopes for imaging the light source in the aperture diaphragm of a condenser, comprising:
   a collector assembly; and
   an apochromaticizing adapter assembly which is associated with the collector assembly;
   wherein the adapter has three lenses, where one lens having negative power is arranged between two lenses having positive power; and
   wherein the optical characteristics of the two lenses having positive power are identical.

3. An optical system with reduced chromatic aberration, for use in microscopes for imaging the light source in the aperture diaphragm of a condenser, comprising:
   a collector assembly; and
   an apochromaticizing adapter assembly which is associated with the collector assembly;
   wherein means are provided for detachably connecting the adapter assembly to interchangeable collector assemblies which have different optical characteristics.

* * * * *